(12) United States Patent
Suga et al.

(10) Patent No.: US 6,321,067 B1
(45) Date of Patent: Nov. 20, 2001

(54) POWER TRANSMISSION SYSTEM IC CARD AND INFORMATION COMMUNICATION SYSTEM USING IC CARD

(75) Inventors: Takashi Suga, Yokohama; Yoshihiko Hayashi, Tokyo; Ryouzou Yoshino, Hadano; Kenji Nagai, Iruma, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 08/929,060

(22) Filed: Sep. 15, 1997

(30) Foreign Application Priority Data

Sep. 13, 1996 (JP) .................................................. 8-243128

(51) Int. Cl.[7] .................................................. H04B 5/00
(52) U.S. Cl. .............................. 455/41; 455/343; 455/106
(58) Field of Search .................... 340/825.54, 825.69, 340/825.72, 10.1, 10.3; 455/572, 127, 557, 558, 41, 73, 343, 573, 80; 235/492, 487; 342/51; 343/895, 867, 701

(56) References Cited

U.S. PATENT DOCUMENTS

| 4,791,285 | | 12/1988 | Ohki . | |
|---|---|---|---|---|
| 5,041,826 | * | 8/1991 | Milheiser | 349/826.69 |
| 5,157,247 | * | 10/1992 | Takahira | 235/492 |
| 5,182,442 | * | 1/1993 | Takahira | 235/492 |
| 5,212,373 | * | 5/1993 | Fujioka et al. | 235/492 |
| 5,220,158 | * | 6/1993 | Takahira et al. | 526/62 |
| 5,287,113 | * | 2/1994 | Meier | 342/51 |
| 5,326,965 | * | 7/1994 | Inoue | 235/492 |
| 5,362,954 | * | 11/1994 | Komatsu | 235/492 |
| 5,412,192 | | 5/1995 | Hoss . | |
| 5,438,335 | * | 8/1995 | Schuermann et al. | 342/51 |
| 5,444,448 | * | 8/1995 | Schuermann et al. | 342/51 |
| 5,610,384 | * | 3/1997 | Goto | 235/435 |
| 5,698,838 | * | 12/1997 | Yamaguchi | 235/492 |
| 5,721,535 | * | 2/1998 | Ikefuji | 340/825.54 |
| 5,754,654 | * | 5/1998 | Hiroya et al. | 380/24 |
| 6,091,935 | * | 7/2000 | Alenxander et al. | 455/41 |

FOREIGN PATENT DOCUMENTS

| 0289136 | | 11/1988 | (EP) . | |
|---|---|---|---|---|
| 0309201 | | 3/1989 | (EP) . | |
| 0453314 | | 10/1991 | (EP) . | |
| 0542229 | | 5/1993 | (EP) . | |
| 0 706 151 | | 4/1996 | (EP) . | |
| PN 0 453 314 A | * | 10/1991 | (EP) | G06K/19/06 |
| 07085233 | | 3/1995 | (JP) . | |
| 0709181 | | 3/1995 | (JP) . | |
| 7-85233 | | 3/1995 | (JP) . | |
| 9-62816 | | 3/1997 | (JP) . | |
| WO 95/35609 | * | 6/1995 | (WO) | H04L/7/027 |

OTHER PUBLICATIONS

Lloy R. Crump, "New radio steals its power from the air", Popular Science, Apr. 1958.*

* cited by examiner

Primary Examiner—Nay Maung
Assistant Examiner—Sonny Trinh
(74) Attorney, Agent, or Firm—Antonelli, Terry, Stout & Kraus, LLP

(57) ABSTRACT

The present invention comprises a power transmission system, an IC card, and an information communication system using an IC card. In the power transmission system, power is transmitted by radio from the power transmission device to the IC card. In the IC card, the transmitted induced power is converted into a DC voltage, the transmitted induced power or a voltage corresponding to the induced power is detected, and a desired DC voltage to be suppled to the internal circuit is obtained in controlling resistance the detected induced power or the voltage corresponding to the induced power.

7 Claims, 13 Drawing Sheets

POWER TRANSMISSION SYSTEM IC CARD AND INFORMATION COMMUNICATION SYSTEM USING IC CARD

BACKGROUND OF THE INVENTION

The present invention relates to a power transmission system, an IC card and an information communication system using an IC card, wherein commutation tickets, railway tickets, bus tickets, etc. to be used at wickets in railway stations or on buses will be replaced with IC cards, and when an IC card is made to pass a reader/writer, being provided at a wicket in a railway station or on a bus, with noncontact or in close proximity to it, power can be transmitted from the reader/writer to the IC card by radio.

It has been known that power can be supplied to an IC card from a power supply side by a noncontact method using rays of light or magnetic fields.

When commutation tickets, railway tickets, bus tickets, etc. to be used at wickets in railway stations or on buses will be replaced with IC cards, and when a user passes an IC card through a reader/writer provided at a wicket in a railway station or on a bus with noncontact, the distance between the IC card and the reader/writer may vary much. When the reader/writer is so adjusted that proper power can be transmitted from the reader/writer to the IC card when the distance between the IC card and the reader/writer is comparatively large, then in a case where the distance between the reader/writer and the IC card is small, excessive power may be transmitted from the reader/ writer to the IC card, which may cause a malfunction or breakage of the IC card.

In other words, in the prior art, careful consideration was not given to a point that proper power shall be stably transmitted to an IC card from a reader/ writer even though the distance between the IC card and the reader/writer may be largely varied.

Prior art in which it is intended to stably supply power from a reader/writer to an IC card even if the distance between the IC card and the reader/writer is largely varied is explained in Japanese Patents Laid-open No. Hei 7-85233 and Laid-open No. 9-62816.

In the Japanese Patent Laid-open No. 7-85233, following are described: among noncontact type data carriers of electromagnetic coupling system, in the case of movable equipment having a function to be able to receive data including a control signal from fixed equipment, a rectifier circuit composed of a rectifier D1 and a capacitor C2, and a variable resistor element composed of a transistor T2, resistor R3 and resistor R4 being controlled by a DC voltage obtained from the rectifier circuit are connected to a receiving coil of the data carrier in parallel, and an excess power will be consumed in the variable resistor elements. Further it is described in the Japanese Patent Laid-open No. Hei 7-85233 that a signal detector circuit composed of a rectifier D2, a resistor R1 and a capacitor C3 which detects an amplitude-modulated wave superimposed on a AC voltage induced in the receiving coil and transmits the detected data to a main circuit of the data carrier as an input signal, and an amplitude modulator circuit which receives the output signal of the main circuit of the data carrier for switching a transistor T1, and being composed of the transistor T1 which transmits data from the data carrier to the fixed equipment, a capacitor C4 and a resistor R2 are connected to the receiving coil of the data carrier in parallel. In the prior art as mentioned in the above, a resonant circuit is not formed in the receiving coil of the data carrier, so that in a case where the distance between the transmitting coil on the fixed side and the receiving coil on the data carrier side is large, an enough voltage is not induced in the receiving coil and it is made difficult to obtain the power required by the main circuit of the data carrier. There is also another problem in the prior art. Since a half-wave rectifier is adopted in the prior art, a large ripple is produced, which requires a large smoothing capacity; therefore, it is made difficult to incorporate a capacitor of a large capacity in a data carrier in miniaturizing it.

It is described in the Japanese Patent Laid-open No. Hei 9-62816 that a receiving signal level of a resonance circuit of an antenna for transmitting and receiving data is detected and the quality factor Q of the antenna resonance circuit is varied by changing the variable resistor element according to the detected voltage in order to adjust a receiving signal level to a desirable value.

In these prior art, since a variable resistor element is directly connected to a receiving antenna in parallel, there is a problem in that the temperature rise in the variable resistor element is large and the size of a pressure protection circuit becomes large.

SUMMARY OF THE INVENTION

The purpose of the present invention is to solve the above-mentioned problems and offer an IC card and a power transmission system by radio in which it is made possible to stably supply power by radio from a reader/ writer to the internal circuit of an IC card in miniaturizing the elements of a pressure protection circuit and decreasing the temperature rise in a variable impedance circuit provided in an IC card even though the distance between the IC card and the reader/writer may be largely varied.

Another object of the present invention is to offer an IC card and a power transmission system by radio in which the power can be stably supplied to the internal circuit of the IC card by radio from a reader and/or writer by only making the IC card pass the reader and/or writer with noncontact or in close proximity to it by improving the responsibility of the system in miniaturizing the elements in a pressure protection circuit and decreasing the temperature rise in a variable impedance circuit.

A further object of the present invention is to offer an IC card and an information communication system using an IC card in which it is made possible to supply power stably from a reader and/or writer to the IC card with noncontact in miniaturizing the elements in the pressure protection circuit and decreasing the temperature rise in the variable impedance circuit provided in the IC card and to perform information communication with high reliability between the reader and/or writer and the IC card.

Yet another object of the present invention is to offer a power transmission system by radio, an IC card and an information communication system using the IC card. In the power transmission system by radio it is so arranged that power can be stably supplied even when the distance between an IC card and a reader/writer is largely varied in decreasing the temperature rise in the variable impedance circuit by controlling the static capacity for the induced power received on the IC card side.

A still further object of the present invention is to offer a power transmission system by radio, an IC card and an information communication system using the IC card. In the power transmission system by radio it is so arranged that proper power can be stably supplied to the IC card by radio from the power transmission portion of the reader/writer by only passing the IC card through the reader/writer with noncontact or in proximity to it and information can be communicated between the reader/writer and the IC card with high reliability.

In order to achieve the above-mentioned objects, the present invention is a power transmission system in which power is transmitted by radio from a power transmitting device (reader and/or writer device) to an IC card. The IC card comprises: an antenna having a resonance circuit for receiving the transmitted radio wave, a full wave rectifier circuit for rectifying an induced power received by the antenna, a power supply circuit which converts a DC voltage output from the full wave rectifier circuit into a power supply voltage, a detector circuit which detects the DC voltage output from the full wave rectifier circuit, an impedance control circuit portion which produces a desired power supply voltage from the DC voltage detected in the detector circuit by controlling the impedance of the circuit, and an internal circuit to be supplied with the desired power supply voltage obtained from the impedance control circuit.

The present invention is also a power transmission system in which power is transmitted by radio from a power transmission device to an IC card, wherein the IC card comprises: a receiving portion which receives the transmitted radio wave and produces induced power, a rectifier circuit portion which converts the induced power in the receiving portion into a DC voltage, a variable impedance circuit portion in which the DC voltage obtained in the rectifier circuit is controlled by varying the impedance of the circuit based on the induced power detected in the detector circuit portion or a voltage corresponding to the induced power, and an internal circuit to be supplied with a controlled DC voltage from the variable-impedance control circuit.

The present invention is also a power transmission system in which power is transmitted by radio from the power transmission device to an IC card. In the IC card, the transmitted induced power is converted into a DC voltage, the transmitted induced power or a voltage corresponding to the induced power is detected, and a power supply voltage of a desired DC voltage to be supplied to the internal circuit is obtained by controlling a static capacity based on the detected induced power or a voltage corresponding to the induced power.

The present invention is a power transmission system in which power is transmitted by radio from a power transmission device to an IC card. The IC card comprises: a rectifier circuit which converts the transmitted induced power into a DC voltage, an internal circuit to be supplied with the DC voltage obtained from the rectifier circuit, a detector circuit which detects the transmitted induced power or a voltage corresponding to the induced power, and a static capacity control circuit which obtains a power supply voltage of a desired DC voltage to be supplied to the internal circuit by controlling the static capacity based on the induced voltage or a voltage corresponding to the induced power which is detected in the detector circuit.

The present invention is a power transmission system in which power is transmitted by radio from a power transmitting device to an IC card. The IC card comprises the functions as shown below: the transmitted induced power is converted into a DC voltage to be supplied to an internal circuit, the transmitted induced power or a voltage corresponding to the induced power is detected, and the information about the detected induced power or a voltage corresponding to the induced power is transmitted by radio to the power transmitting device. The power transmitted from the power transmitting device is controlled based on the above-mentioned transmitted information.

The present invention is a power transmission system in which power is transmitted by radio from a power transmitting device to an IC card. The IC card comprises the function to convert the transmitted induced power into a DC voltage and to supply the DC voltage to the internal circuit, and also to detect the information concerning the relative position of the IC card to that of the power transmitting device. The power transmitted from the power transmission device is controlled based on the above-mentioned detected information.

The present invention is a power transmission system in which power is transmitted by radio from a power transmitting device to an IC card. The IC card comprises the function to convert the transmitted induced power into a DC voltage and to supply the DC voltage to the internal circuit and to detect the information concerning the relative position of the IC card to that of the power transmitting device. A desired DC voltage can be obtained in controlling the impedance of a circuit in the IC card based on the detected information.

The present invention is an IC card which comprises: an antenna having a resonance circuit for receiving a transmitted radio wave, a full wave rectifier circuit for rectifying an induced power received with the antenna, a power supply circuit for converting the DC voltage obtained from the full wave rectifier circuit into a power supply voltage, a detector circuit for detecting the DC voltage rectified in the full wave rectifier circuit, an impedance control circuit which controls the impedance of the circuit for making the detected DC voltage a desired DC voltage and making the power supply voltage converted in the power supply circuit a desired power supply voltage, and an internal circuit to be supplied with the desired power supply voltage obtained from the impedance control circuit portion.

The present invention is an IC card which comprises: a receiver portion which receives a radio wave to produce an induced power, a rectifier circuit portion for rectifying the induced power generated in the receiver portion to convert the induced power to a DC voltage, a detector circuit portion which detects an induced power obtained in the receiver portion or a voltage corresponding to the induced power, a variable impedance control circuit portion which controls the DC voltage obtained from the rectifier circuit portion based on the induced power detected in the detector circuit portion or a voltage corresponding to the induced power, and an internal circuit to be supplied with a controlled DC voltage from the variable impedance control circuit portion.

The present invention comprises an IC card in which an impedance in the variable impedance circuit portion is formed with a resistor.

The present invention is an IC card in which the full wave rectifier circuit, the power supply circuit, the detector circuit, the impedance control circuit, and the internal circuit are composed with one chip.

The present invention is an IC card which comprises: a receiver portion which receives an induced power by radio, a rectifier circuit portion which rectifies the induced power received in the receiver portion to convert it into a DC voltage, a detector circuit portion which detects the induced power obtained from the receiver portion or a voltage corresponding to the induced power, a static capacity control circuit portion which obtains a desired DC voltage from the rectifier circuit portion by controlling the static capacity based on the induced power detected in the detector circuit portion or a voltage corresponding to the induced power, and an internal circuit which is supplied with a DC voltage from the rectifier circuit portion being controlled by the static capacity control circuit portion.

The present invention is an information communication system using an IC card which comprises a reader and/or writer device (unit) having an information communication portion and a power transmitting portion and power is transmitted by radio from the power transmitting portion to an IC card.

The IC card comprises: a rectifier circuit portion which rectifies the induced power transmitted from the reader and/or writer to convert the induced power into a DC voltage, a detector circuit portion which detects the induced power obtained from the receiver portion or a voltage corresponding to the induced power, a variable impedance control circuit portion which controls the impedance of the circuit according to the DC voltage obtained from the rectifier circuit portion based on the induced power detected in the detector circuit portion or a voltage corresponding to the induced power, and an internal circuit which obtains a desired DC voltage from the variable impedance control circuit. The information communication system is so designed that an information communication can be performed using a radio wave between the internal circuit of the IC card and the information communication portion of the reader and/or writer device.

Transmitted to the IC card or a voltage corresponding to the induced power is detected, and a desired DC voltage is obtained in controlling the impedance base on the detected induced power or a voltage corresponding to the induced power and the desired DC voltage is supplied to the internal circuit. The present invention is so constituted that it is possible to perform information communication by radio between the internal circuit of the IC card and the information communication portion of the reader and/or writer device.

The present invention is an information communication system using an IC card, which comprises reader and/or writer device having an information communication portion and a power transmission portion and power is transmitted by radio from the power transmitter portion to the IC card by radio. The IC card comprises: an antenna having a resonance circuit for receiving a radio wave transmitted from the reader and/or writer device, a full wave rectifier circuit for rectifying the induced power received in the antenna, a power supply circuit which converts the DC voltage rectified in the full wave rectifier circuit into a power supply voltage, a detector circuit which detects the DC voltage rectified in the full wave rectifier circuit, an impedance control circuit which controls the impedance of the circuit to make a detected DC voltage detected in the detector circuit a desired DC voltage and to make the power supply voltage converted in the power supply circuit a desired power supply voltage, and an internal circuit to be supplied with the desired power supply voltage obtained from the impedance control circuit.

The information communication system is so designed that the information communication can be performed by a radio wave between the internal circuit of the IC card and the information communication portion of the reader and/or writer device.

The present invention is an information communication system using an IC card which comprises a reader and/or writer device having an information communication portion and a power transmission portion which transmits power from the power transmission portion to the IC card by radio.

In the IC card, following operations are performed: the induced power transmitted from the reader and/or writer device is converted into a DC voltage and it is supplied to the internal circuit, the induced power transmitted to the IC card or a voltage corresponding to the induced power is detected, and the information concerning the detected induced power or the voltage corresponding to the induced power is transmitted to the power transmission portion of the reader and/or writer device by radio. The reader and/or writer controls the power to be transmitted from the power transmission portion based on the information sent from the IC card. The information communication system is so designed that information communication can be performed between the internal circuit of the IC card and the information communication portion of the reader and/or writer device.

The present invention is an information communication system using an IC card, wherein the transmission of power by radio from the reader and/or writer to the IC card and the communication of information by radio between the internal circuit of the IC card and the information communication portion of the reader and/or writer device are performed with a common antenna.

The present invention is an information communication system, using an IC card, wherein the reader and/or writer device comprises: a power supply portion which generates a signal to be used for the transmission of power, an encoder circuit for encoding input data for transmission, a modulator which executes amplitude modulation of a signal obtained from the encoder circuit and superimposes it on the signal obtained from the power supply portion, a feeder circuit for feeding power based on the signal obtained from the modulator, and an antenna for generating a radio wave corresponding to the fed current by the feeder circuit.

The present invention is an information communication system using an IC card, wherein the internal circuit of the IC card comprises: a decoder circuit which performs waveform shaping and decodes a modulated wave for communication detected by the antenna, a microcomputer which inputs received data decoded in the decoder circuit and outputs transmission data, an encoder circuit which encodes the transmitting data output from the microcomputer, and a modulator which modulates a signal and inputs it to the antenna based on the signal encoded in the encoder circuit.

As explained in the above, according to the above-mentioned constitution, it is made possible to realize a power transmission system by radio and an IC card, wherein even though the distance between the IC card and the reader and/or writer device (power transmitting device) is largely varied, power can be stably transmitted by radio from the reader and/or writer device to the internal circuit of the IC card in miniaturizing a pressure protection circuit provided in the IC card and decreasing the temperature rise in a variable impedance circuit. In particular, the realization of miniaturization of the elements of the pressure protection circuit and the low temperature rise in the variable impedance circuit made it possible to constitute an IC card with an antenna for receiving a radio wave and elements of one-chip constitution, which caused to realize a low cost IC card.

According to the above-mentioned constitution, a power transmission system by radio and an IC card can be realized, wherein power can be transmitted from the reader and/or writer device to the IC card by radio using a coil-shaped antenna or a spiral antenna on the IC card, and power can be supplied stably by radio from the reader and/or writer device to the internal circuit of the IC card by only making an IC card pass the reader and/or writer device with noncontact or in the proximity to it in miniaturizing the elements in the pressure protection circuit, decreasing the temperature rise in the variable impedance circuit, and improving the responsibility of the circuit.

According to the above-mentioned constitution, a power transmission system by radio, an IC card, and an information communication system using an IC card can be realized, wherein power can be stably supplied to the IC card even though the distance between the IC card and the reader and/or writer is largely varied in decreasing the temperature rise in the variable impedance circuit by controlling the induced power received on the side of the IC card by varying the static capacity in the variable impedance circuit.

According to the above-mentioned constitution, a power transmission system by radio, an IC card, and an information communication system using the IC card can be realized, wherein proper power can be transmitted from the power transmission portion of the reader and/or writer device to the IC card by radio by only making the IC card pass the reader and/or writer with noncontact or in proximity to it. Thus, power is stably supplied to the internal circuit of the IC card, and the communication of information of high reliability can be performed between the reader and/or writer device and the IC card.

According to the above-mentioned constitution, an information communication system using an IC card can be realized, wherein power is stably supplied from the reader and/or writer to the IC card with noncontact, and the communication (transmission and reception) of information of high reliability can be performed between the reader and/or writer device and the IC card.

DETAILED DESCRIPTION OF THE PREFERRED EMBODIMENTS

Figure 1:
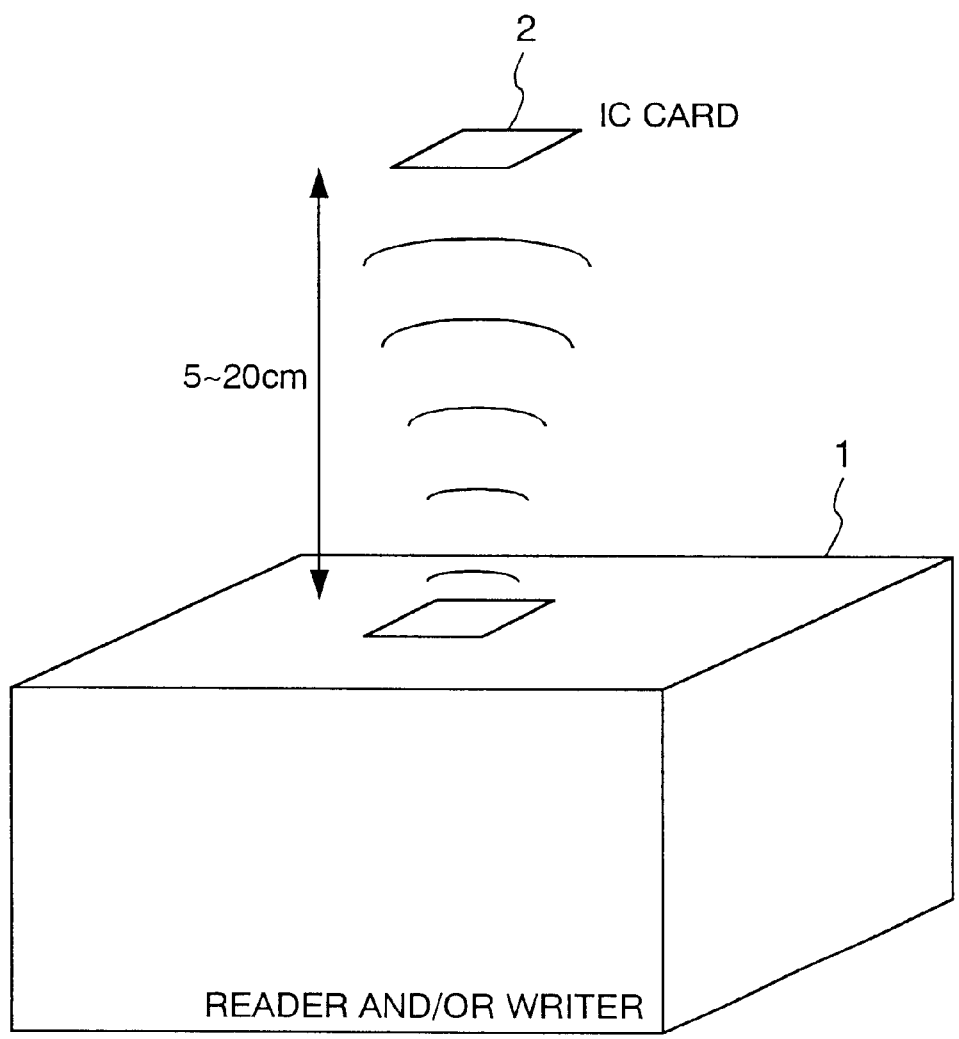
FIG. 1 shows a schematic of a power transmission system according to the present invention, in which power is transmitted by radio from a reader and/or writer device provided at a wicket in a railway station or on a bus to an IC card which is passed the reader and/or writer device with noncontact or in proximity to it.

In the following, the forms of embodiments of a power transmission system by radio and an IC card according to the present invention will be explained referring to the drawings.

FIG. 1 is a schematic view of a power transmission system according to the present invention in which power is transmitted by radio from a reader and/or writer 1 provided at a wicket in a railway station or on a bus to an IC card 2 which is to be passed the reader and/or writer 1 with noncontact or in proximity to it. The IC card 2 is passed the reader and/or writer 1 provided at the wicket in a railway station or on a bus by an user with noncontact, at a distance of about 5 to 20 cm. In that case, the information concerning railway tickets, commutation tickets, etc. is communicated by radio between the reader and/or writer and the IC card; thereby, the IC card will be able to perform the role of a railway ticket, commutation ticket, or the like.

Figure 2:
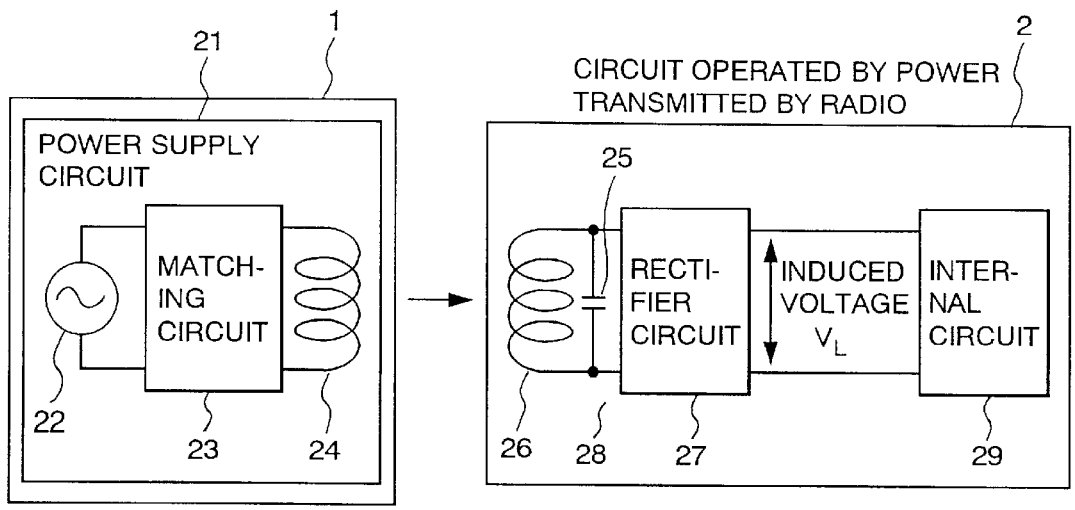
FIG. 2 shows a power transmission system by radio according to the present invention.

FIG. 2 shows a schematic view of a power transmission system by radio according to the present invention. A reference numeral 21 denotes a power supply circuit in the reader and/or writer 1 provided at a wicket in a railway station or on a bus. The power supply circuit 21 comprises: a power supply 22 which generates a high frequency voltage of 13.56 MHz, an impedance matching circuit 23 which prevents reflection at a junction point, and a coil 24 which transmits power of about 2 to 5 W of 13.56 MHz by radio. The IC card comprises an induced voltage generator portion 28 which is composed of a coil 26 which receives power by radio from the power supply circuit 21 provided in the reader and/or writer and a rectifier circuit 27 which converts the high frequency power received by the coil 26 into a DC voltage of the order of 7 to 15 V, and an internal circuit 29 (constituted with an IC chip, for example) which is operated with a DC voltage of the order of 7 to 10 V generated in the induced voltage generator portion 28.

In order to be able to supply a desired DC voltage to the internal circuit 29, even though the distance between the IC card 2 and the reader and/or writer 1 may be extremely large, a resonance circuit with a tuning capacitor 25 is provided in the coil 26 to be able to obtain a large induced voltage. The coil 26 has a multilayer structure of more than 2 layers in which a spiral-shaped antenna coil is wound continuously in the same direction, so that stray capacitance between windings and the inductance of the coil may constitute a resonance circuit. As a result, a tuning capacitor 25 may not be needed or an extremely small one will do the work.

In order to transmit power by radio, a coil (a coil-shaped or spiral-shaped antenna) 24 and a coil (a coil-shaped or spiral-shaped antenna) 26 are used for the purpose of improving the responsibility of the system to be able to supplying power to the internal circuit constituted with an IC chip, for example) of the IC card 2 in less than 0.1 sec. It has a merit to improve the strength of the IC card 2 against deformation by forming the coil 26 on the IC card 2. Therefore, if it is possible to transmit power to the internal circuit 29 of the IC card 2 in less than 0.1 sec., a light emitting element and a light receiving element can be used in place of the coils 24 and 26.

Figure 3:
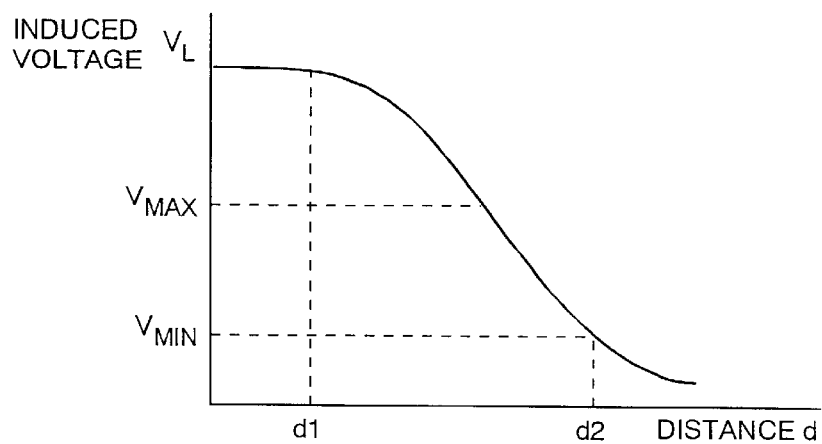
FIG. 3 shows the relation between d and VL, where d denotes the distance between a coil of a power supply circuit provided in a reader and/or writer and an IC card, and VL denotes an induced voltage VL obtained from an rectifier circuit.

FIG. 3 shows the relation between d and VL, where d denotes the distance between the coil 24 of the power supply circuit 21 provided in a reader and/or writer 1 and the IC card 25, and VL denotes the induced voltage obtained from the rectifier circuit 27. As shown in FIG. 3, in the case where the system is so designed that when the distance d between the coil 24 of the power supply circuit 21 and the IC card 25 is at its maximum value d2 of about 20 cm, the allowable minimum voltage Vmin of about 2 to 4 V can be obtained, when the distance d between the coil 24 of the power supply circuit 21 is at its minimum value d1 of about 5 cm, the induced voltage VL becomes the order of 40 V which largely exceeds the allowable maximum voltage Vmax which may cause malfunction in the internal circuit 29 or breakage of it.

Accordingly in the present invention, the induced voltage VL obtained from the rectifier circuit 27 shall be constantly controlled to be in the allowable range of the induced voltage, from Vmin to Vmax, even when an IC card is passed the reader and/or writer 1 with noncontact at a distance of about 5 to 20 cm.

Figure 4:
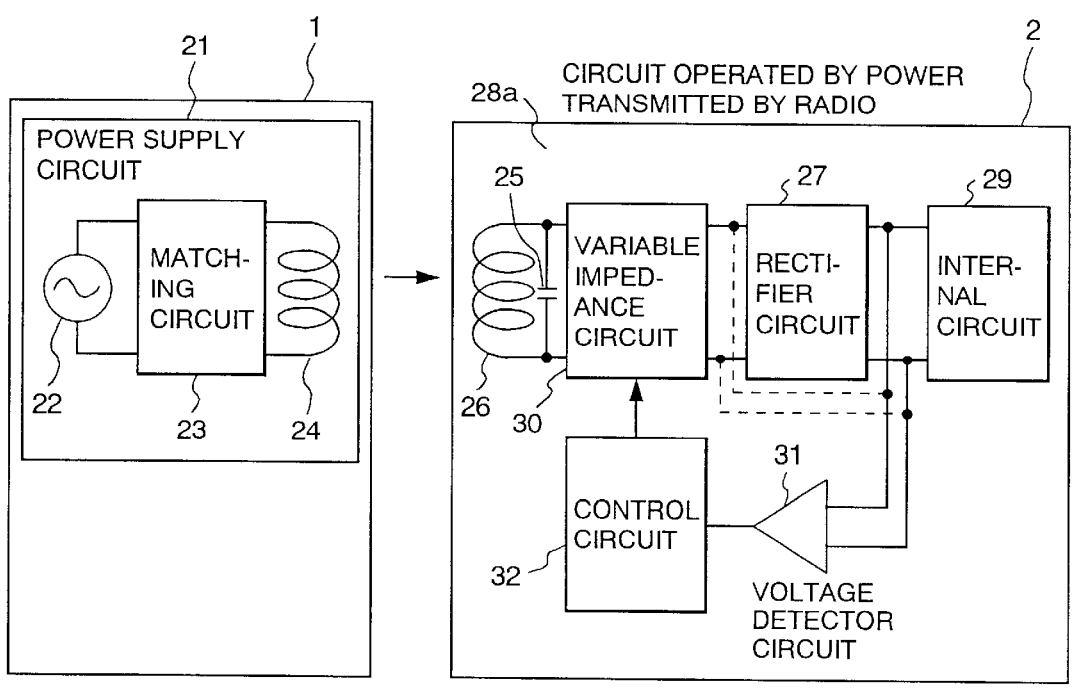
FIG. 4 shows a schematic of a first embodiment of the power transmission system by radio according to the present invention.

In the next step, the form of a first embodiment of a power transmission system by radio according to the present invention will be explained referring to FIG. 4. FIG. 4 shows a schematic view showing the form of the first embodiment of the power transmission control system by radio according to the present invention. The power supply circuit 21 provided in the reader and/or writer 1 has the same constitution as that shown in FIG. 2. An induced voltage generator portion 28a is composed of the coil 26 and the rectifier 27 shown in FIG. 2 added with the following circuits: a variable impedance circuit 30 which supplies a controlled high frequency power to the rectifier circuit 27 in controlling the high frequency power obtained from the coil 26 by varying its impedance, a voltage detector circuit 31 which detects the induced voltage VL obtained from the rectifier circuit 27, and a control circuit 32 which controls the variable impedance circuit 30 by varying its impedance based on the induced voltage detected in the induced voltage detector circuit 31. The internal circuit 29 in the IC card 2 is the same as that shown in FIG. 2. The voltage detector circuit 31, as shown by a chain line, can be a circuit which calculates the mean value of induced voltages by detecting a high frequency power (a high frequency voltage) obtained from the variable impedance circuit 30, for example.

In an arrangement as shown in the above, the voltage detector circuit detects the induced voltage VL obtained from the reifier circuit 27 and when it detects a voltage which deviates out of the allowable induced voltage range Vmin to Vmax, the impedance of the variable impedance circuit 30 is controlled by the control circuit 32, and the high frequency power obtained from the coil 26 is supplied to the rectifier circuit 27 being controlled to be a proper value; thereby, a voltage which is constantly kept in the allowable induced voltage range can be obtained from the rectifier circuit 27. In the result, even when the distance between the reader and/or writer 1 and the IC card 2 approaches 5 cm, it is possible to supply a voltage in the allowable range of the induced voltage to the internal circuit 29. In the above, it is possible to constitute the rectifier circuit 27 and the internal circuit 29 with one IC chip.

Figure 5:
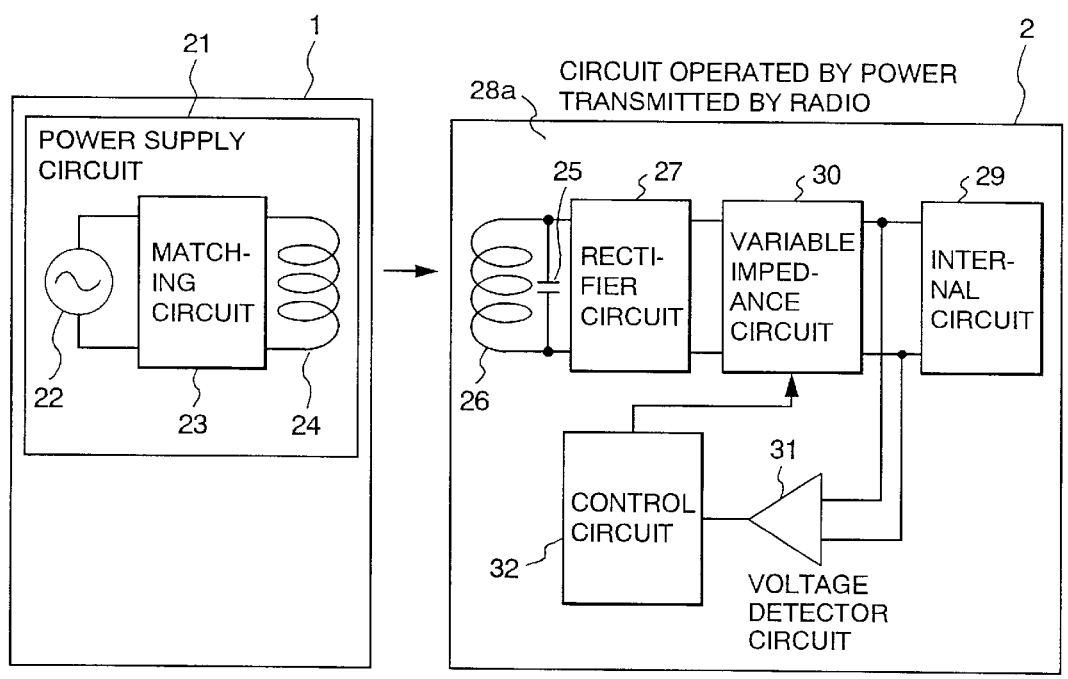
FIG. 5 shows a schematic of a second embodiment of a power transmission system by radio according to the present invention.

In the next step, a second embodiment of the power transmission control system by radio according to the present invention will be explained referring to FIG. 5. FIG. 5 shows a schematic view of the second embodiment of the power transmission control system according to the present invention. In the second embodiment shown in FIG. 5, a different point from the first embodiment shown in FIG. 4 is in that the variable impedance circuit 30 is provided following the rectifier circuit 27. The constitution of the power supply circuit 21 provided in the reader and/or writer is the same as that shown in FIG. 2. The induced voltage generator portion 28a in the IC card 2 is composed of a rectifier circuit 27 which converts the high frequency power obtained from the coil 26 into a DC voltage VL, a voltage detector circuit 31 which detects the DC voltage VL obtained from the rectifier circuit 27, a variable impedance circuit 30 which supplies a controlled DC voltage to the internal circuit 29, the controlled DC voltage which is obtained from the DC voltage output from the rectifier circuit 27 being controlled by varying its impedance based on the induced voltage detected by the voltage detector circuit 31, and the control circuit 32 which controls the impedance of the variable impedance circuit 30 to vary. The internal circuit 29 in the IC card 2 is the same as that shown in FIG. 2.

In the arrangement as mentioned in the above, the voltage detector circuit 31 detects the rectified induced voltage VL obtained from the rectifier circuit 27 and when it is detected that the voltage deviates out of the allowable induced voltage range, Vmin to Vmax, the impedance of the variable impedance circuit is controlled by the control circuit 32 to correct the deviation, thus a DC voltage obtained from the rectifier circuit 27 is controlled and supplied to the internal circuit 29; thereby, a voltage in the range of allowable induced voltage can be constantly obtained from the rectifier 27. In the result, even when the distance between the reader and/or writer 1 and the IC card 2 approaches 5 cm it is possible to supply a voltage in the allowable range to the internal circuit 29.

Figure 6:
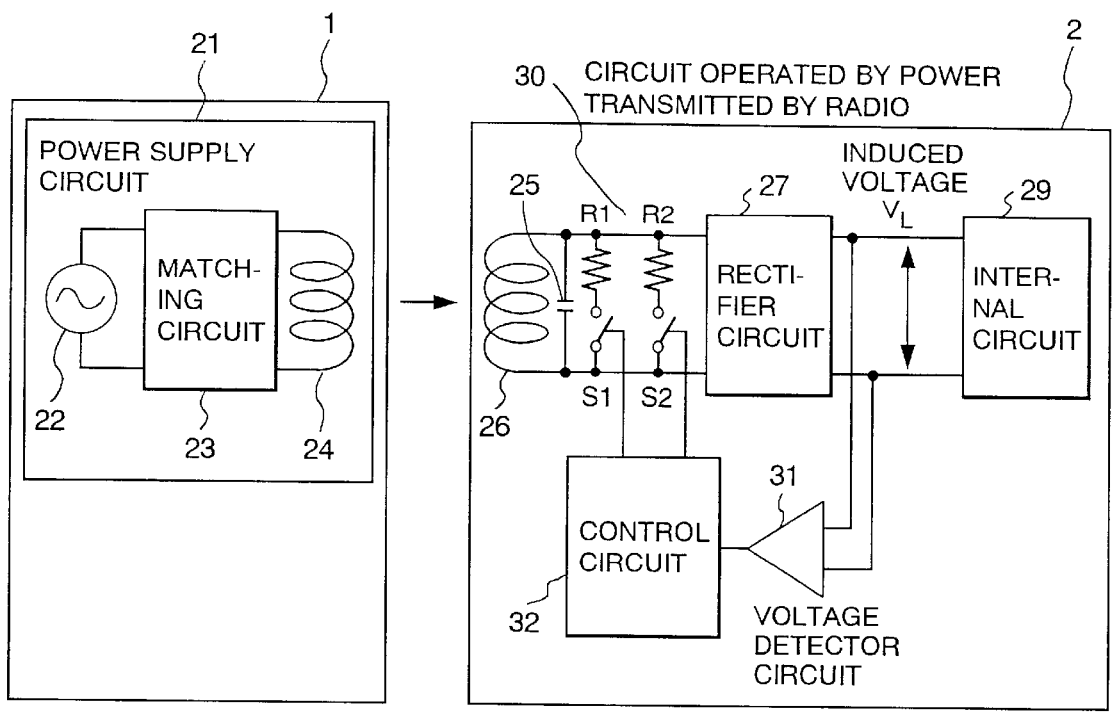
FIG. 6 shows a concrete form of the variable impedance circuit 30 shown in FIG. 4 in the first embodiment.
Figure 7:
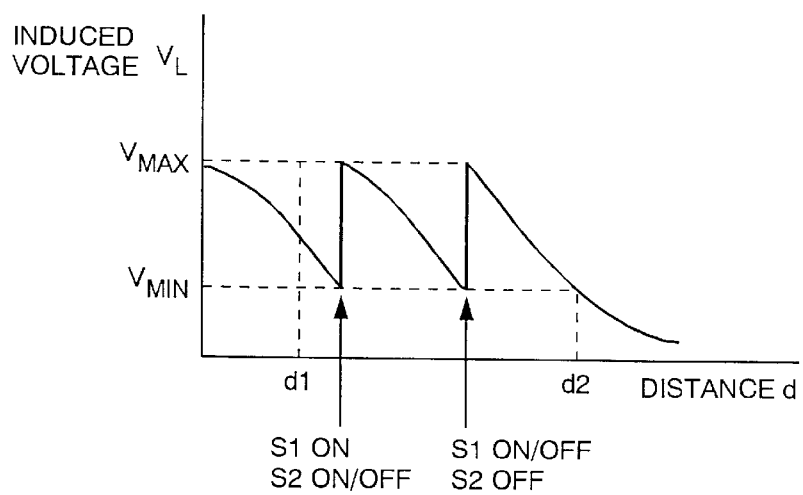
FIG. 7 shows a state where an induced voltage is controlled within an allowable range owing to impedance control.
Figure 14:
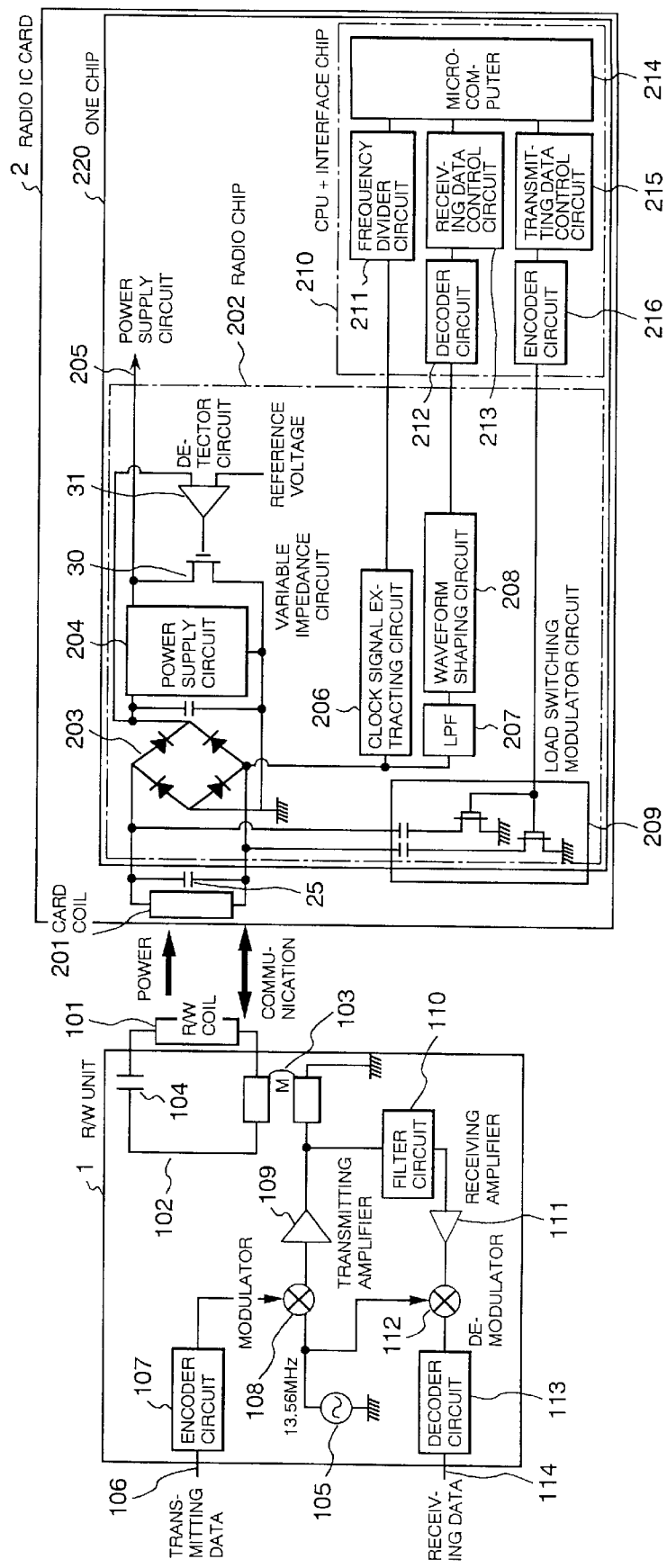
FIG. 14 shows a schematic view of the whole of the present invention including the part in which an IC card functions the roles of railway tickets, commutation tickets, etc. in transmitting or receiving the information concerning railway tickets, commutation tickets, etc. by radio in the second embodiment.

FIG. 6 shows a concrete form of the variable impedance circuit 30 shown in FIG. 4 in the first embodiment. In the variable impedance circuit, there are two circuit elements, an resistor R1 and an electron switch 1 connected in series and an resistor R2 and an electron switch 2 connected in series, and a coil 26 is connected with both above-mentioned circuit elements in parallel, which constitutes the variable impedance circuit 30. The ON-OFF operations of these electron switches, S1 and S2, are controlled by control signals from the control circuit 32. As shown in FIG. 7, when the distance between the coil 24 of the power supply circuit 21 and the coil 26 of the IC card 2 being denoted by d decreases to a smaller one being off from d2, a large value of d, and the rectified induced voltage VL exceeds Vmax, at first, the electron switch S1 is made ON in the state where the electron switch S2 is kept OFF by a control signal from the control circuit 32, then the resistor R1 is connected and the induced voltage VL is lowered to the Vmim. When the coil 26 of the IC card 2 further approaches the coil 24 of the power supply circuit and the induced voltage VL exceeds the Vmax again, the electron switch S2 is made ON in the state where the electron switch S1 is kept ON, then both resistors R1 and R2 are connected and the rectified induced voltage VL is lowered to the Vmin; therefore, even when the distance between the coil 26 of the IC card and the coil 24 of the power supply circuit is decreased to d1, it will be possible to keep the voltage VL not to exceed the Vmax. The allowable range between the Vmin and Vmax can be made narrower by increasing the number of resistors. As mentioned in the above, when the variable impedance circuit 30 is constituted with a circuit in which a resistor R1 and an electron switch S1 are connected in series and also a resistor R2 and an electron switch S2 are connected in series, and both circuit elements are connected to the coil 26 in parallel, the variable impedance circuit 30 can be an excellent circuit in responsibility. The variable impedance circuit 30 mentioned in the above can be applied to the variable impedance circuit 30 composed of a variable resistor element shown in FIG. 5. In particular as shown in FIG. 14, a variable impedance circuit 30 is provided next to a constant voltage power supply circuit 204 which is provided following a rectifier circuit 27 (203), which makes it possible to miniaturize the elements in the pressure protection circuit 30. Owing to it, a wireless chip 202 can be constituted small and in the result, it is made possible to cut down the cost of the IC card, not only that of the chip.

Figure 8A:
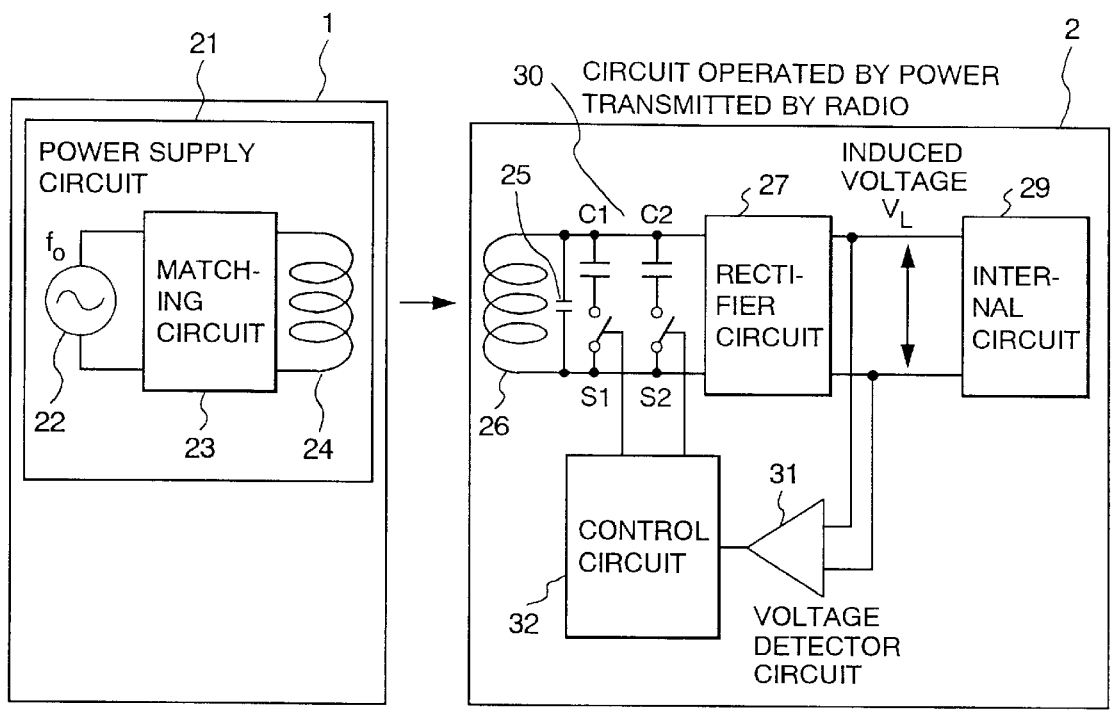
FIGS. 8(a) and 8(b) show a concrete form of the variable impedance circuit 30 shown in FIG. 4 in the second embodiment.
Figure 8B:
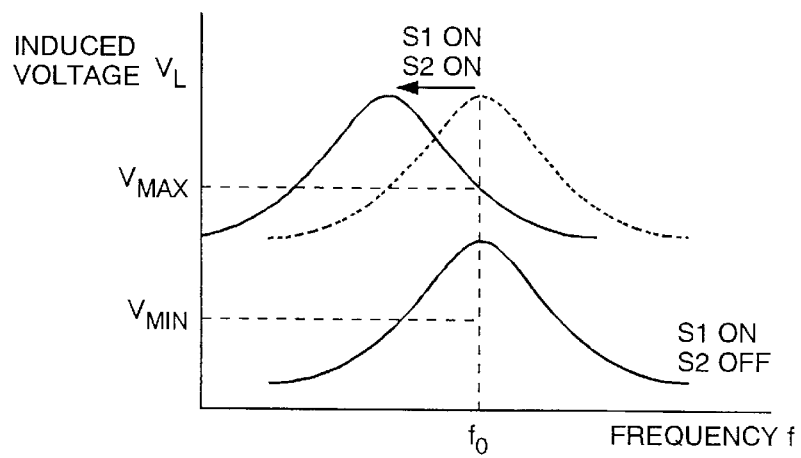

FIG. 8(a) shows a concrete form of the variable impedance circuit 30 shown in FIG. 4 in the second embodiment 2. The variable impedance circuit 30 is constituted with the circuit elements as described below: 2 circuit elements, a capacitor C1 and an electron switch S1 being connected in series, and a capacitor C2 and an electron switch S2 being connected in series, are connected to the coil 26 in parallel. These electron switches, S1 and S2, are ON-OFF controlled by a control signal from the control circuit 32. In the constitution as mentioned in the above, in the same way as the first embodiment shown in FIG. 5, it is possible to control the rectified induced voltage VL obtained from the rectifier circuit 27 to be in the allowable voltage range, from Vmin to Vmax, even when the coil 26 on the IC card 2 is made to be in a close proximity to the coil 24 of the power supply circuit 21, which will be understood from the relation shown in FIG. 7(b). In the case of the second embodiment, in comparison with the case of the first embodiment, the temperature rise can be controlled to be low, which means the upgrade in reliability. In order to realize the second embodiment, however, it is indispensable to have a technology of manufacturing a variable capacitor of a miniature size.

Figure 9A:
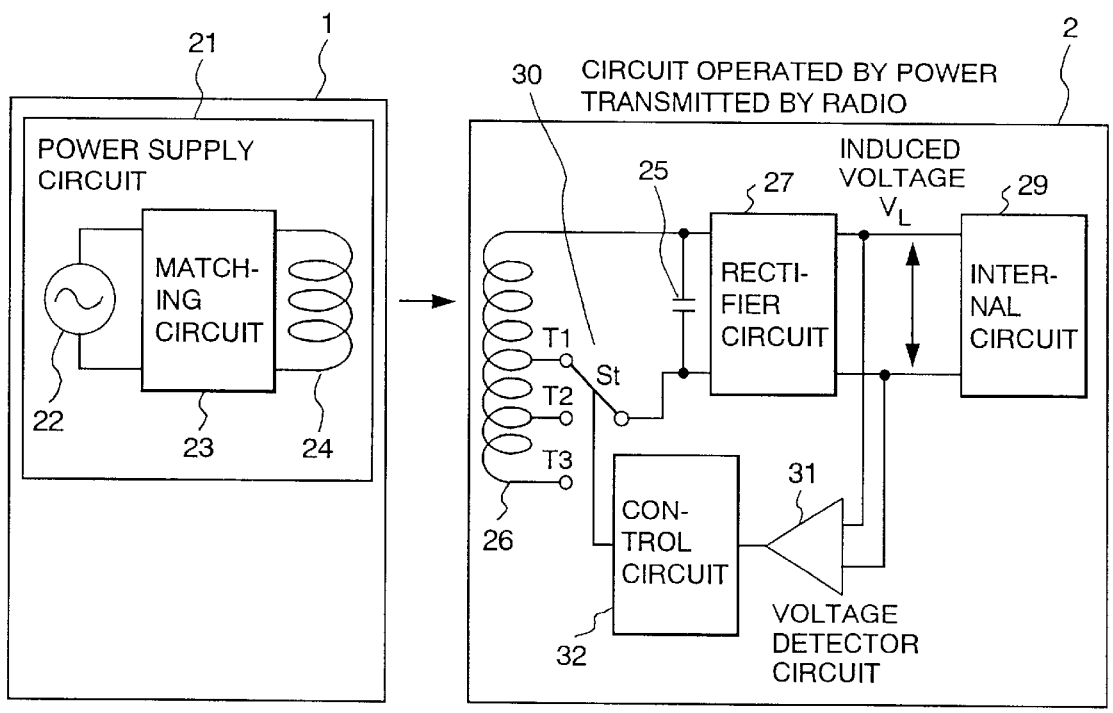
FIGS. 9(a) and 9(b) show a concrete form of the variable impedance circuit 30 shown in FIG. 4 in a third embodiment.
Figure 9B:
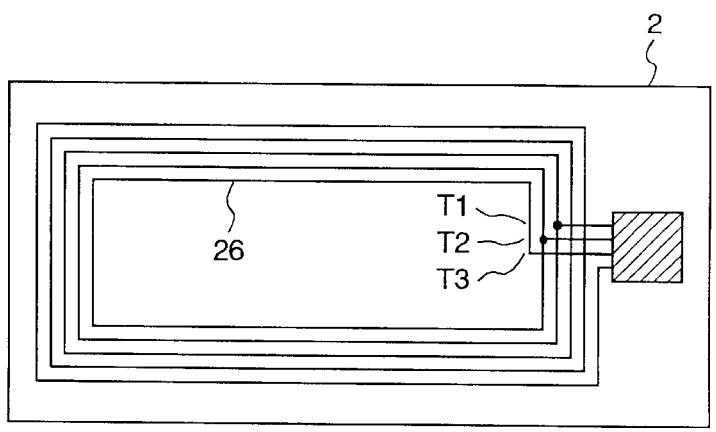

FIG. 9 shows a concrete form of the variable impedance circuit 30 shown in FIG. 4 in a third embodiment. The variable impedance circuit 30 is constituted as shown in the following: terminals, T1, T2 and T3 are formed corresponding the length of the coil 26 and an electron switch St which is able to change over the connection to T1, T2 or T3 is provided, the switch St which can be changed over by a control signal from the control circuit 32. In the constitution as mentioned in the above, it is also possible to vary the high frequency power induced in the coil 26; therefore, it is also made possible to control the rectified induced voltage VL obtained from the rectifier circuit 27 to be in the allowable voltage range even when the coil 26 on the IC card 2 made to be in a close proximity to the coil 24 of the power supply circuit 21.

In the next step, a third embodiment of the power transmission control system by radio according to the present invention will be explained referring to FIG. 10.

Figure 10:
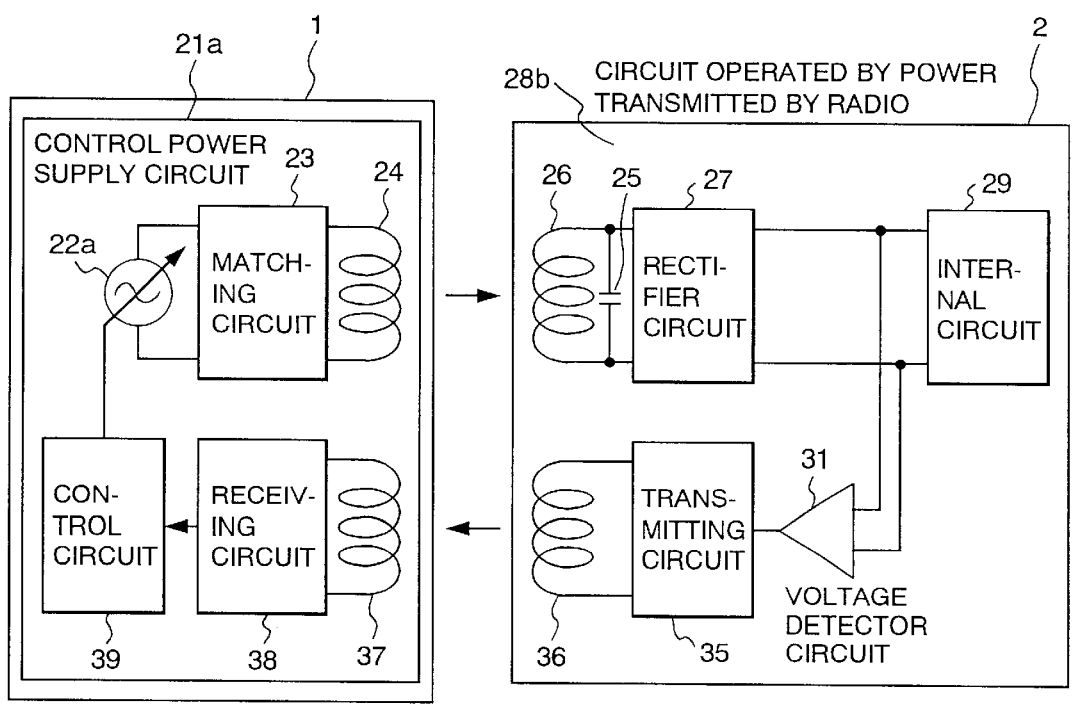
FIG. 10 shows a schematic view of a power transmission control system by radio in the third embodiment according to the present invention.

FIG. 10 shows a schematic view of a power transmission control system by radio in a third embodiment according to the present invention. The power supply circuit 21 provided in the reader and/or writer 1 comprises: a control power supply 22a which generates a high frequency voltage of 13.56 MHz of a variable voltage, a matching circuit 23 for impedance matching, a coil 24 for transmitting a radio wave of 13.56 MHz in a power level of approximately 2 to 5 W, a receiving coil (coil-shaped, or spiral-shaped antenna) 37 and a receiving circuit 38 for receiving a radio signal concerning an induced voltage transmitted from the IC card 2, and a control circuit 39 which controls the high frequency voltage output from the control power supply 22a based on the induced voltage value received in the receiving circuit 38. The induced voltage generator portion 28b on the IC card 2 is composed of a coil 26, a rectifier circuit 27 shown in FIG. 2 and the circuits as shown in the following: a voltage detector circuit 31 which detects a rectified induced voltage VL obtained from the rectifier circuit 27, a transmitting circuit 35 for transmitting a signal concerning the value of an induced voltage detected in the voltage detector circuit 31 to the coil 37 of the power supply circuit 21a by a radio wave, and a coil (coil-shaped or spiral-shaped antenna) 36. The internal circuit 29 on the IC card 2 is the same as that shown in FIG. 2.

In the constitution as mentioned in the above, the voltage detector circuit 31 detects a rectified induced voltage VL obtained from the rectifier circuit 27, a signal concerning the detected induced voltage value is transmitted to the coil 37 of the power supply circuit 21a by the transmitting circuit 35 and the coil 36 by radio to be received by the coil 37 and receiving circuit 38.

The control circuit 39 detects the deviation of the rectified induced voltage VL out of the allowable range of the rectified induced voltage value, from Vmin to Vmax, base on the signal of the rectified induced voltage value received in the receiving circuit 38 and controls the high frequency voltage of the control power supply 22a, and the controlled high frequency power transmitted from the coil 24 to the coil 26 is supplied to the rectifier circuit 27; therefore, a voltage with a value in the range of allowable induced voltage value can be constantly obtained from the rectifier circuit 27. In the result, even when the distance between the reader and/or writer 1 and the IC card 2 approaches to the order of 5 cm, it is possible to supply a voltage in the allowable range to the internal circuit 29.

Figure 11:
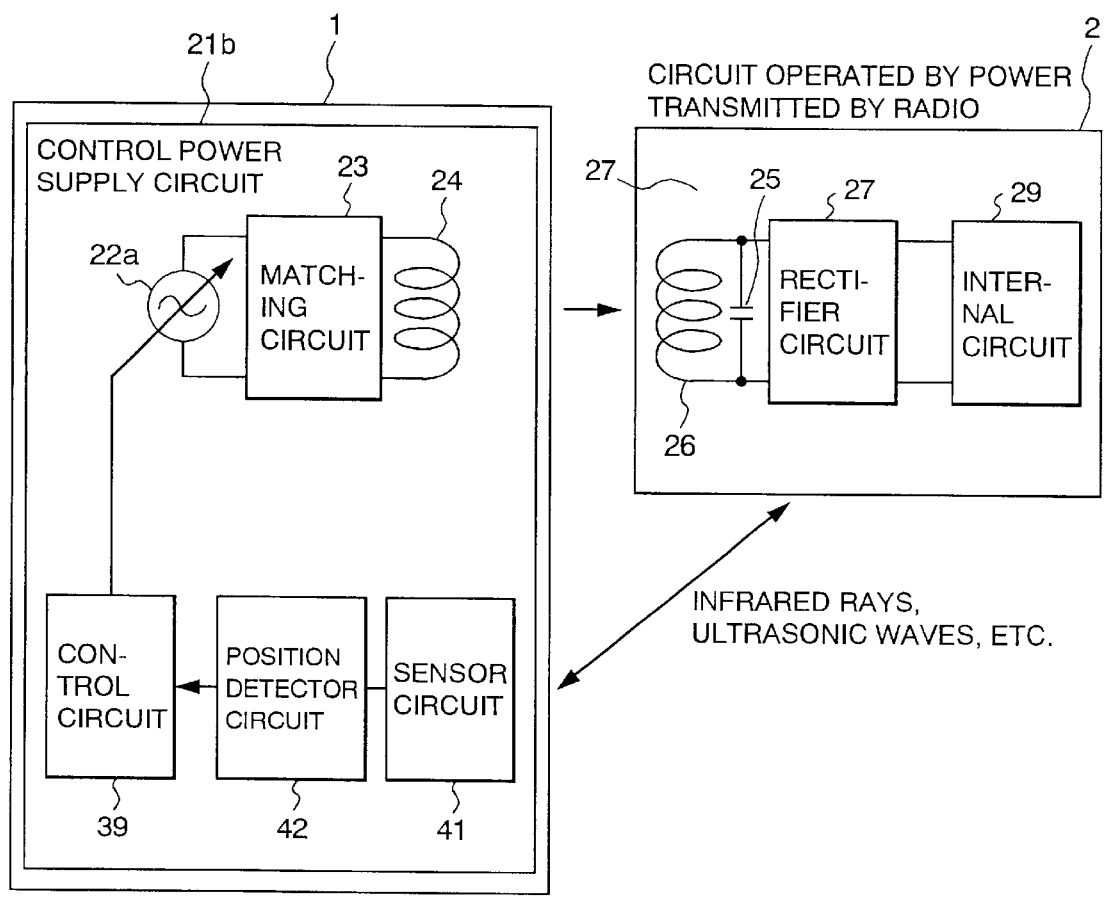
FIG. 11 shows a schematic view of a power transmission control system by radio in a fourth embodiment according to the present invention.

In the next step, a fourth embodiment of the power transmission control system by radio according to the present invention will be explained referring to FIG. 11. FIG. 11 shows a schematic view of a fifth embodiment of the power transmission control system by radio according to the present invention. The power supply circuit 21b provided in the reader and/or writer 1 comprises: a control power supply 22a which generates a high frequency variable voltage of 13.56 MHz, a matching circuit 23 for impedance matching, a coil 24 for transmitting high frequency power having the frequency of 13.56 MHz and power level of about 2 to 5 W. a sensor circuit 41 which detects an instantaneous distance from a passing IC card 2 using infrared rays or ultrasonic waves, a position detector circuit 42 which calculates an instantaneous distance (position) from a passing IC card 2 using a signal obtained from the sensor circuit 41, and a control circuit 39 which controls the high frequency voltage of the control power supply 22a based on the information of an instantaneous distance d (position) from an passing IC card 2 detected in the position detector circuit 42. The induced voltage generator portion 28 on the IC card 2 is composed of the coil 26 and the rectifier circuit 27 shown in FIG. 2.

In the constitution as mentioned in the above, it is possible to constantly obtain a voltage which is in the allowable range of the rectified induced voltage value from the rectifier circuit 27 by an arrangement as shown in the following: the sensor circuit 41 detects the instantaneous distance from a passing IC card 2 using infrared rays or ultrasonic waves, with the detected signal, the position detector circuit 42 calculates an instantaneous distance (position) from the passing IC card 2, the control circuit 39 calculates a high frequency voltage value to be generated from the control power supply 22a from the relation between the distance d and the rectified induced voltage VL shown in FIG. 3 based on the information of an instantaneous distance (position) d from the IC card 2 calculated in the position detector circuit 42, and controls to generate the calculated high frequency voltage value from the control power supply 22a, and also controls the high frequency power to be transmitted from the coil 24 to the coil 26 to supply the controlled power to the rectifier circuit 27. In the result, even when the distance between the reader and/or writer 1 and the IC card 2 approaches to about 5 cm, it is made possible to supply a voltage in the allowable range to the internal circuit 29.

Figure 12:
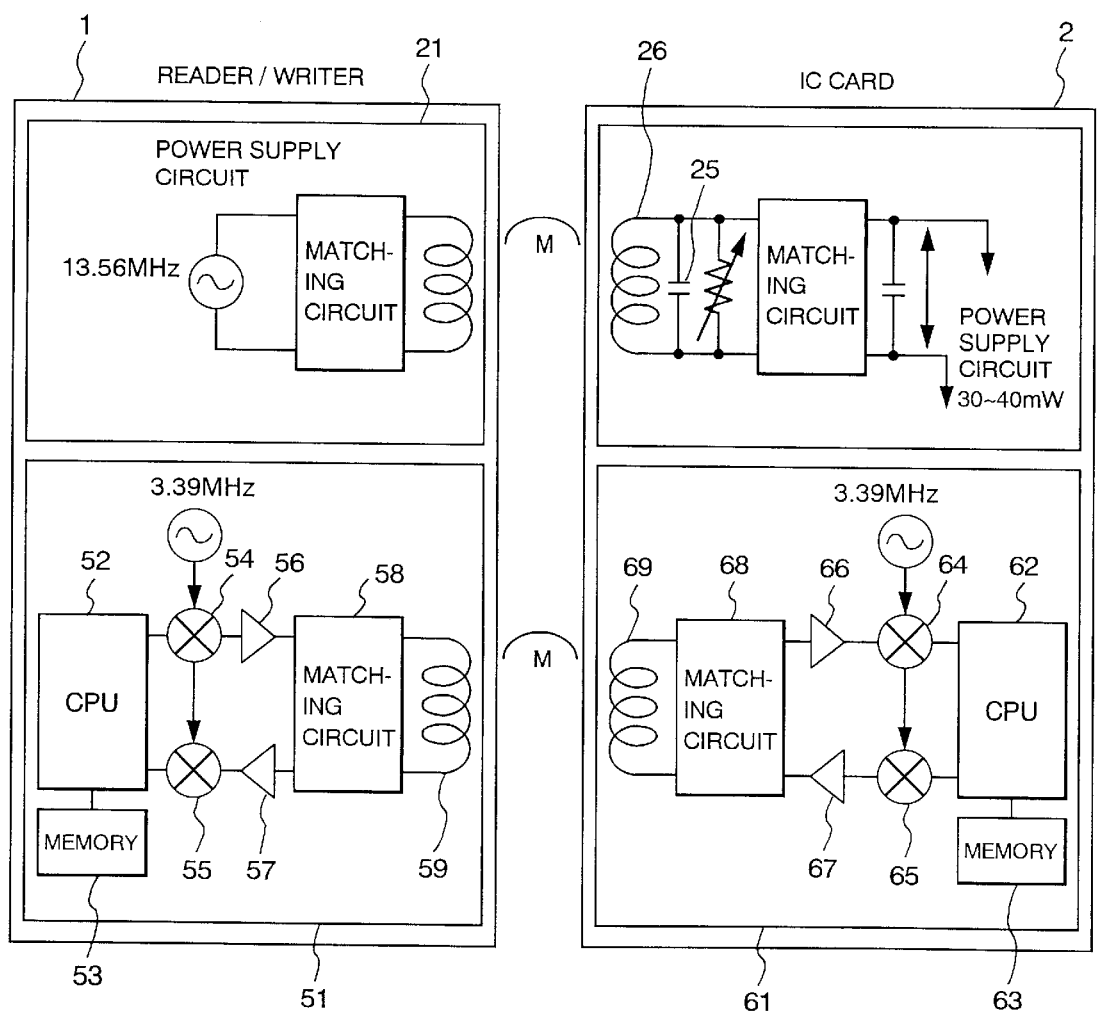
FIG. 12 shows a schematic view of the whole of the present invention including the part in which an IC card functions the roles of railway tickets, commutation tickets, etc. in transmitting or receiving the information concerning railway tickets, commutation tickets, etc. by radio in the first embodiment.

In the next step, the whole of the system according to the present invention including the part in which the information concerning railway tickets or commutation tickets is communicated by radio and an IC card performs the role of a railway ticket or commutation ticket will be explained in the following. FIG. 12 shows a schematic view of a first embodiment concerning the whole system including the part in which the information concerning railway tickets or commutation tickets is communicated by radio and an IC card performs the role of a railway tickets or commutation ticket.

The reader and/or writer 1 comprises, besides the power supply circuit 21, an information transmitter-receiver portion 51 which communicates with the IC card 2 about the information by radio. The information transmitter-receiver portion 51 is connected to a communication network and a mechanism to open or close a wicket door or a display device, and outputs data to be transmitted to the IC card 2 to a modulator portion 54 and is composed of the following: a CPU 52 which processes data obtained from a demodulator portion 55 and outputs them, a memory 53 which stores data or processing program data obtained from the IC card 2, a modulator portion 54 which modulates the data from the CPU 52 with 3.39 MHz to transmit the data to the IC card 2, an amplifier 56 which amplifies the modulated data in the modulator portion 54, a coil 59 which exchanges data by radio with the IC card 2, an amplifier 57 which amplifies the data received by the coil 59, a demodulator portion 55 to demodulate the signal amplified in the amplifier 57 with 3.39 MHz, and a matching circuit 58 for impedance matching.

The IC card 2 comprises an induced voltage generator portion 28 and an internal circuit 29, and the internal circuit 29 is composed of the following: a memory 63 which stores data concerning railway tickets, commutation tickets, etc., a CPU 62 which controls the memory 63 concerning read, write, etc., a modulator portion 65 which modulates the data read from the memory 63 with a signal of 3.39 MHz, an amplifier 67 which amplifies the signal from the modulator portion 65, a coil 69 which exchanges data by radio with the coil 59 of the data receiving and transmitting portion 51, an amplifier 66 which amplifies the data received by the coil 69, a demodulator portion 64 which demodulates the signal amplified in the amplifier 66 with 3.39 MHz, and a matching circuit 68 for impedance matching.

In the constitution as mentioned in the above, power is transmitted by radio from the reader and/or writer 1 provided at a gate in a railway station or on a bus to an IC card which is passed the reader and/or writer with noncontact or in the proximity to it, a stabilized DC voltage of 7 to 15 volt is supplied to the internal circuit on the IC card 2, which makes it possible to let the internal circuit 29 including the CPU 62, etc. operate stably. In the result, it is made possible that an IC card 2 is able to exchange data by radio concerning railway tickets, commutation tickets, etc. with the reader and/or writer provided at a wicket or on a bus when the IC card 2, being held by a user, is passed the reader and/or writer with noncontact or at a distance of about 5 to 20 cm; thereby, it is made possible that an IC card 2 functions as a railway ticket or a commutation ticket.

Figure 13:
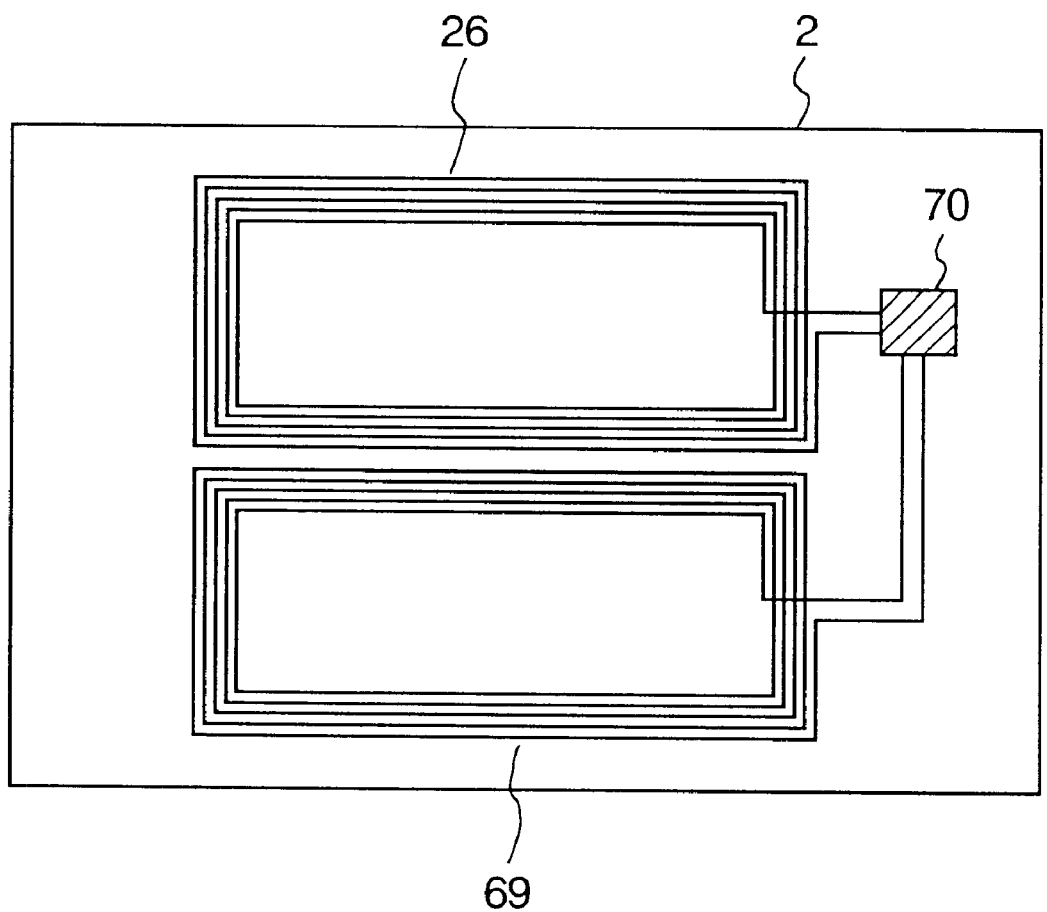
FIG. 13 shows a plan view showing the mounted state of elements on an IC card according to the present invention.

FIG. 13 shows the state of one or two circuit chips 70 mounted with parts such as the coil 26, the coil 69, and other circuits, 28, 27, 29, and 32, being connected to the coil 26 and the coil 69.

In the case of the embodiment shown in FIG. 9, the length of the coil 26 will be lengthened by increasing number of turns and taps, T1, T2 and T3 will be provided to input to the circuit chip 70.

Figure 15:
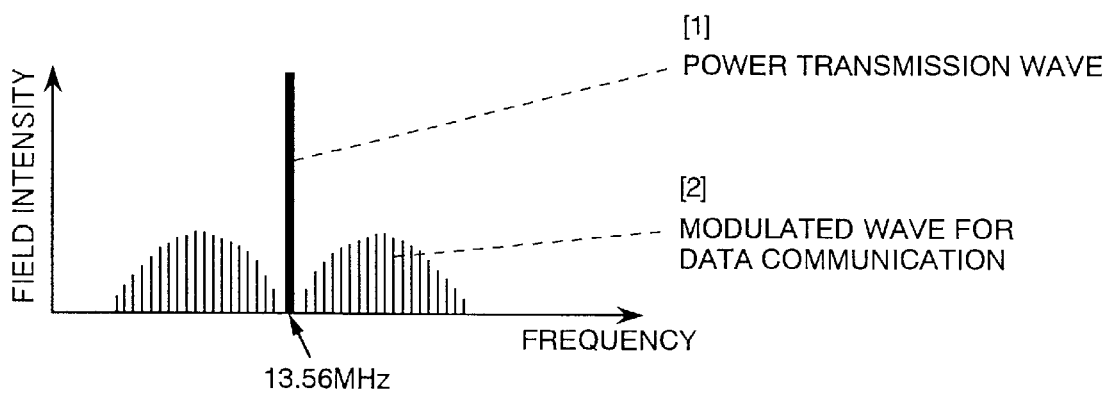
FIG. 15 shows the relation between the power transmitting wave and the modulated wave for the data communication according to the present invention.

FIG. 14 shows a schematic view of an embodiment concerning the whole including a part where an IC card functions the role of a railway ticket, commutation ticket, or the like in exchanging data concerning railway tickets, commutation tickets, etc. with a reader and/or writer by radio. The second embodiment shown in FIG. 14 shows the case where both transmission of power and communication are performed using a radio wave being composed of a power transmission wave and data communication modulated wave as shown in FIG. 15 between a R/W coil (coil-shaped or spiral-shaped R/W antenna) 101 provided on the R/W unit 1 and a card coil (coil-shaped or spiral-shaped card antenna) 201 provided on an IC card 2. As shown in the above, in the ASK modulation system, the power transmission wave and the signal wave have different frequency components seen from a frequency region, but seen from a time region only the amplitude of the power transmission wave varies corresponding to the signal speed. In other words, in the time region, the modulated wave of the power transmission wave multiplied by the signal wave is seen as if only the amplitude is varied up and down. When the modulated wave is transmitted by radio, it can be considered to use separate antennas respectively, but in the present invention, in order to simplify the noncontact card 2 (proximity radio card, IC card), the field intensity is limited to be within the range decided by the Wireless Telegraphy Act (500 $\mu$V at a distance of 3m) and a single antenna (R/W coil) is used to transmit the modulated wave.

The R/W (reader and/or writer) unit 1 comprises the following: a power supply 105 which generates a high frequency voltage of 13.56 MHz, an encoder circuit 107 which encodes input data 106 to be transmitted to a proximity radio card 2, a modulator 108 which superimposes a voltage being amplitude modulated (amplitude shift keying modulation) by a signal encoded in the encoder circuit 107 upon a high frequency voltage of 13.56 MHz generated in the power supply 105, a transmitting amplifier 109 which amplifies a signal ASK-modulated and superimposed upon the high frequency voltage of 13.56 MHz in the modulator 108, an impedance matching circuit (feeding circuit) 102 having a capacitor 104 and being coupled with a signal amplified in the transmitting amplifier 109 through an inductance coupling 103, a R/W coil 101 which generates a radio wave to transmit power and data corresponding to the output of the matching circuit 102 and receives data transmitted from the card coil 201 of the proximity radio card 2 by a radio wave, a filter circuit 110 which removes noise from a signal received by the R/W coil 101 and transferred through the inductance coupling 103 passing through the matching circuit 102, a receiving amplifier 111 which amplifies a signal obtained from the filter circuit 110, a demodulator 112 which demodulates a signal amplified by the receiving amplifier 111 using a signal of high frequency voltage of 13.56 MHz obtained from the power supply 105, and a decoder circuit 113 which outputs a signal as received data 112 in decoding a signal demodulated in the demodulator 112.

A proximity radio card (noncontact card, IC card) 2 comprises a card coil 201, radio chip 202 and a CPU+ interface chip 210. The radio chip 202 and the CPU+ interface chip 210 can be constituted with one chip by miniaturizing the radio chip 202.

The card coil 201 receives a radio wave generated to perform transmission of power and data from the R/W coil 101 in the R/W unit 1, and generates a radio wave corresponding to the transmitting data which is processed by load-switching modulation.

The radio chip 202 comprises: an impedance matching and rectifier circuit 203 which functions as a rectifier for the power signal of 13.56 MHz received by the card coil 201 and also functions as a matching circuit for the transmitting and receiving signal, a constant voltage power supply circuit 204 which supplies a constant DC voltage 205 of about 2 to 5 V at a power level of about 5 mW obtained from a rectified induced voltage output from the matching and rectifier circuit 203, a voltage detector circuit 31 which detects the comparison data between the DC voltage VL obtained from the matching and rectifier circuit 203 and a standard (reference) voltager a variable impedance control circuit 30 being composed of variable resistor elements such as FET which supplies DC power to the IC chips, 202 and 210, as a DC power supply voltage 205 in controlling the DC voltage output from the constant voltage power supply circuit 204 in varying its impedance based on the DC voltage detected in the voltage detector circuit 31, a clock signal extracting circuit 206 which extracts a clock signal from a receiving signal obtained from the card coil 201, an LPF circuit 207 which removes noise component from the receiving signal obtained from the card coil 201, a waveform shaping circuit 208 which shapes the waveform of a receiving signal obtained from the LPF circuit 207, a load switching modulator circuit 209 which modulates a transmitting signal and supplies the modulated signal to the card coil 201 through the matching and rectifier circuit 203.

The CPU+interface chip 210 is composed of a frequency divider circuit 211 which generates a signal for operating the microcomputer 214 in dividing the frequency of a clock signal extracted by the clock signal extracting circuit 206 of the radio chip 202, a decoder circuit 212 which decodes a signal obtained from the waveform shaping circuit 208 of the radio chip 202, a receiving data control circuit 213 which controls decoded data (receiving data) obtained from the decoder circuit 212 and inputs the data to the microcomputer 214, a transmitting data control circuit 215 which obtains data from the microcomputer 214 in controlling the transmitting data, an encoder circuit 216 which encodes transmitting data obtained from the transmitting data control circuit 215 in controlling them and inputs the data to the load switching modulator circuit 209 of the radio chip 202, and a microcomputer 214 of H8, etc. which comprises a built-in memory for storing information as a card and performs the processing of transmitting and receiving data and the transfer of data with the memory; thereby the CPU+interface chip 210 will be supplied with a stable power supply voltage 205 from the constant voltage power supply circuit 204 on the radio chip 202.

The purpose of using the R/W coil 101 and the card coil 201 for transmitting power by a radio wave is to upgrade the efficiency of power transmission in a short range. When the coil 201 is formed on the proximity radio card, it helps the card to be strong against deformation. Both R/W coil 101 and card coil 201 can be formed with spiral antennas.

Even in a case where the distance between the IC card 2 and the reader and/or writer 1 is extremely large, in order to be able to supply a desired DC voltage to the internal circuits, 210 and 202 (29), a resonance circuit is formed in the card coil 201 in connecting a tuning capacitor to it. When the card coil 201 is formed to have a multilayered structure of more than 2 layers, which can be formed by winding a spiral-shaped antenna coil consecutively in the same direction, the inductance of the coil and the stray capacity among the windings may constitute a resonance circuit. As a result, a tuning capacitor 25 may not be needed or an extremely small one will do the work.

Since a full wave rectifier circuit is employed as the rectifier circuit 203, ripples are little and a smoothing capacitor becomes small, so that a smoothing capacitor can be incorporated in a chip in miniaturizing it, which makes it possible to miniaturize the radio chip 202.

In particular, the elements in the pressure protection circuit can be miniaturized by providing a variable impedance circuit 30 composed of variable resistor elements after the constant voltage power supply circuit provided following the rectifier circuit 203, in the result, the radio chip 202 can be formed small and the cost of not only the chip but also that of the IC card can be decreased, moreover the temperature rise in the variable impedance circuit 30 composed of variable resistor elements can be decreased, which will upgrade the reliability of the chip 220.

As explained in the above, in a proximity radio card system, power can be transmitted by radio, and further information communication by radio can be performed between the reader and/or writer 1 and the noncontact card 2 when the noncontact card (proximity radio card , IC card) 2 is made to approach the reader and/or writer 1. In other words, in a proximity radio card system, a power transmission wave or communication wave is radiated by a coil or a spiral antenna 101 in a reader and/or writer, and the radio wave is received by a coil or a spiral antenna 201 on the side of a card; thereupon, a voltage is induced which operates the circuits on the side of the card and signals are detected.

As explained in the above, according to the present invention, there is an effect that a system can be realized in which power can be stably supplied by radio from a reader and/or writer device (power transmitting device) to the internal circuit on the IC card in miniaturizing the elements in the pressure protection circuit and decreasing the temperature rise in the variable impedance circuit even when the distance between the IC card and the reader and/or writer device may be largely varied, In particular, since it is made possible to miniaturize the elements in the pressure protection circuit and to decrease the temperature rise in the variable impedance circuit, an IC card can be constituted with an antenna for receiving a radio wave and the elements of one chip, which allows to realize a low cost IC card.

According to the present invention, there is an effect that a power transmission system by radio and an IC card can be realized, wherein the IC card is arranged to be able to perform transmission of power by radio for the reader and/or writer using a coil-shaped or spiral-shaped antenna coil, and power can be stably supplied by radio from a reader and/or writer device (power transmitting device) to the internal circuit on the IC card by only making the IC card pass the reader and/or writer device (power transmitting device) with noncontact or in proximity to it in miniaturizing the elements in the pressure protection circuit, decreasing the temperature rise in the variable impedance circuit, and improving the responsibility of the system.

According to the present invention, there is an effect that a power transmission system by radio, an IC card, and an information communication system using the IC card can be realized, wherein even though the distance between the IC card and the reader and/or writer may largely vary, power can be supplied stably to the IC card in decreasing the temperature rise in the variable impedance circuit by controlling the induced power received on the IC card side varying the static capacity in the circuit According to the present invention, a proper power can be transmitted from the power transmission portion of the reader and/or writer to the IC card by radio by only passing the IC card through the reader and/or writer with noncontact or in proximity to it; thereby, a DC voltage can be stably supplied to the internal circuit of the IC card and information communication can be performed with high reliability between the reader and/or writer and the IC card.

According to the present invention, there is an effect that an information communication system using an IC card can be realized in which information communication can be performed with high reliability between the reader and/or writer device and the IC card in supplying a stabilized power from the reader and/or writer device to the IC card with noncontact.

What is claimed is:

1. A power transmission system in which power is transmitted by radio wave from a power transmission device to an IC card, said IC card comprising:
   a converter circuit including a first antenna having a resonance circuit for receiving said transmitted radio wave and a rectifier circuit which converts an induced power received in said antenna into a DC voltage in rectifying it, the DC voltage being supplied to an internal circuit,
   a detector circuit portion for detecting one of the induced power obtained from said first antenna of the converter circuit and a voltage corresponding to said induced power, and
   a transmission unit which transmits an information by a radio wave to the power transmission device, the information concerning with said one of the induced power and the voltage detected by said detector circuit portion; and
   said power transmission device comprising:
      a receiving unit which receives said information by the radio wave being transmitted from the transmitting unit of the IC card,
      a control power supply circuit which controls an output of high frequency power based on the information received by receiving unit, and
      a power transmitting unit having a second antenna for transmitting the output of high frequency power by the radio wave, the output of high frequency power being controlled by said control power supply circuit.

2. A power transmission system in which power is transmitted by radio wave from a power transmission device to an IC card, said IC card comprising;
   a converter circuit including a first antenna having a resonance circuit for receiving said transmitted radio wave and a rectifier circuit which converts induced power received in said antenna into a DC voltage in rectifying it,
   an internal circuit to be supplied with the DC voltage which is converted in said rectifier circuit of said convertor circuit,
   a detector circuit which detects one of said induced power and a voltage corresponding to said induced power, and
   a transmission unit which transmits an information by a radio wave to said power transmission device, the information concerning with said one of the induced power and the voltage detected by the detector circuit; and
   said power transmission device comprising:
      a receiving unit which receives said information by the radio wave being transmitted from the transmission unit of the IC card,
      a control power supply circuit which controls an output of high frequency power based on the information received by the receiving unit, and
      a power transmitting unit having a second antenna for transmitting the output of high frequency power by the radio wave, the output of high frequency power being controlled by said control power supply circuit.

3. A power transmission system in which power is transmitted by radio wave having a predetermined high frequency from a power transmission device to an IC card, said IC card comprising:
   an antenna having a resonance circuit which comprises by connecting in parallel with a coil and a capacitor for receiving said transmitted radio wave and generating an induced voltage;
   a rectifier circuit portion which converts an induced voltage generated from said antenna into a DC voltage in rectifying it;
   a detector circuit portion which detects an information corresponding to relative distance between the IC card and the power transmission device;
   a variable resonance frequency control circuit which controls the induced voltage generated from said antenna in accordance with shifting resonance frequency of said resonance circuit by varying one of capacitance of the capacitor and inductance of the coil based on said information corresponding to relative distance detected by the detector circuit portion to control the DC voltage obtained from said rectifier circuit; and
   an internal circuit to be supplied with a controlled DC voltage being obtained from said rectifier circuit portion.

4. A power transmission system comprising:
   an IC card comprising:
      a converter circuit including a first antenna having a resonance circuit for receiving radio wave being transmitted from a power transmission device and a rectifier circuit which converts an induced power received in said antenna into a DC voltage in rectifying it, and
      an internal circuit to be supplied with the DC voltage which is converted in said rectifier circuit of said converter circuit; and
   said power transmission device comprising:

a detector unit which detects an information corresponding to relative distance between the IC card and the power transmission device, a control power supply circuit which controls by varying a level of a high frequency power based on the information corresponding to relative distance detected by the detector unit and generates a controlled level of the high frequency power, and a power transmitting unit having a second antenna for transmitting the controlled level of the high frequency power being generated from said control power supply circuit to the first antenna of the converter circuit of the IC card by the radio wave.

5. A power transmission system as claimed in claim 4, wherein the detector unit is formed by a distance detector unit which detects a relative distance information between the IC card and the power transmission device.

6. A power transmission system as claimed in claim 4, wherein the detector unit is formed by a distance detector unit which detects a relative distance information between the IC card and the power transmission device by using one of infrared rays and ultrasonic rays.

7. A power transmission system as claimed in claim 4, wherein the power transmission device is formed by a reader and/or writer.

\* \* \* \* \*